United States Patent
Cournoyer

(10) Patent No.: US 8,059,168 B2
(45) Date of Patent: Nov. 15, 2011

(54) SYSTEM AND METHOD FOR SCENE CHANGE TRIGGERING

(75) Inventor: Alexis J. Cournoyer, Portsmouth, RI (US)

(73) Assignee: GTech Corporation, Providence, RI (US)

( * ) Notice: Subject to any disclaimer, the term of this patent is extended or adjusted under 35 U.S.C. 154(b) by 500 days.

(21) Appl. No.: 12/234,992

(22) Filed: Sep. 22, 2008

(65) Prior Publication Data

US 2009/0015697 A1    Jan. 15, 2009

Related U.S. Application Data

(63) Continuation-in-part of application No. 11/376,052, filed on Mar. 14, 2006, now Pat. No. 7,920,299.

(60) Provisional application No. 60/661,698, filed on Mar. 14, 2005.

(51) Int. Cl.
*H04N 9/68*    (2006.01)

(52) U.S. Cl. ............... 348/234; 348/208.14; 348/222.1

(58) Field of Classification Search ............ 348/208.14, 348/222.1, 234; 358/471
See application file for complete search history.

(56) References Cited

U.S. PATENT DOCUMENTS

| | | |
|---|---|---|
| 4,141,036 A | 2/1979 | Diehl |
| 4,240,748 A | 12/1980 | Blanc et al. |
| 4,724,307 A | 2/1988 | Dutton et al. |
| 4,736,109 A | 4/1988 | Dvorzsak |
| 4,760,247 A | 7/1988 | Keane et al. |
| 5,039,847 A | 8/1991 | Morii et al. |
| 5,216,595 A | 6/1993 | Protheroe |
| 5,239,165 A | 8/1993 | Novak |
| 5,258,605 A | 11/1993 | Metlitsky et al. |
| 5,262,624 A | 11/1993 | Koch |
| 5,362,105 A | 11/1994 | Scott |
| 5,417,424 A | 5/1995 | Snowden et al. |
| 5,452,379 A | 9/1995 | Poor |
| 5,673,125 A | 9/1997 | Merecki et al. |

(Continued)

FOREIGN PATENT DOCUMENTS

EP    1 172 756 A1    1/2002

(Continued)

OTHER PUBLICATIONS

International Search Report and Written Opinion dated May 19, 2010, International Application No. PCT/US2009/057610.

(Continued)

*Primary Examiner* — Gevell Selby

(74) *Attorney, Agent, or Firm* — McCarter & English, LLP; Kia L. Freeman, Esq.

(57) ABSTRACT

A triggering system and process for a form reader is shown using a histogram of the optical scene. The form reader is open on three sides with a camera facing a platen on to which a form is placed. The camera converts the light rays reflected from the platen into a video stream that is sent to a processor. A change in content of a first light intensity level contrasted to the content of a second light intensity level is used to determine when the form enters the scene. Illustratively, the first light intensity level represents black levels and the second light intensity levels represent white levels. A threshold is pre-determined that isolates the first light intensity content, and when the first light intensity content remains constant (after the presence of a form) the form is deemed to be still wherein the system may then read the information on the form.

12 Claims, 2 Drawing Sheets

U.S. PATENT DOCUMENTS

| | | | |
|---|---|---|---|
| 5,734,153 | A | 3/1998 | Swartz et al. |
| 5,818,026 | A | 10/1998 | Melling et al. |
| 5,821,518 | A | 10/1998 | Sussmeier et al. |
| 5,834,749 | A | 11/1998 | Durbin |
| 5,945,655 | A | 8/1999 | Gilgeous et al. |
| 6,150,930 | A | 11/2000 | Cooper |
| 6,157,435 | A | 12/2000 | Slater et al. |
| 6,176,429 | B1 | 1/2001 | Reddersen et al. |
| 6,199,044 | B1 | 3/2001 | Ackley et al. |
| 6,223,986 | B1 | 5/2001 | Bobba et al. |
| 6,234,899 | B1 | 5/2001 | Nulph |
| 6,262,670 | B1 | 7/2001 | Ballou |
| 6,340,114 | B1 | 1/2002 | Correa et al. |
| 6,356,365 | B1 | 3/2002 | Oida et al. |
| 6,357,658 | B1 | 3/2002 | Garczynski et al. |
| 6,366,696 | B1 | 4/2002 | Hertz et al. |
| 6,494,372 | B2 | 12/2002 | Bruchlos et al. |
| 6,650,427 | B2 | 11/2003 | Brooks et al. |
| 6,722,569 | B2 | 4/2004 | Ehrhart et al. |
| 6,736,319 | B2 | 5/2004 | Swanson et al. |
| 6,760,476 | B2 | 7/2004 | Meder |
| 6,776,337 | B2 | 8/2004 | Irwin, Jr. et al. |
| 6,875,105 | B1 | 4/2005 | Behm et al. |
| 6,887,153 | B2 | 5/2005 | Walker et al. |
| 6,929,184 | B2 | 8/2005 | Barkan |
| 6,954,290 | B1 | 10/2005 | Braudaway et al. |
| 6,971,577 | B2 | 12/2005 | Tsikos et al. |
| 7,060,968 | B1 | 6/2006 | Leviton |
| 7,090,131 | B2 | 8/2006 | Natsuno |
| 7,124,945 | B2 | 10/2006 | Kim |
| 7,247,095 | B2 | 7/2007 | Nulph |
| 7,527,206 | B2 | 5/2009 | Zhu et al. |
| 7,635,088 | B2 | 12/2009 | Chung et al. |
| 7,674,171 | B2 | 3/2010 | Walker et al. |
| 2001/0025880 | A1 | 10/2001 | Bruchlos et al. |
| 2001/0029513 | A1 | 10/2001 | Kuwano et al. |
| 2002/0010022 | A1 | 1/2002 | Vincent |
| 2002/0048403 | A1 | 4/2002 | Guerreri |
| 2002/0109866 | A1 | 8/2002 | Yang et al. |
| 2003/0102376 | A1 | 6/2003 | Meier et al. |
| 2003/0173404 | A1 | 9/2003 | Chung et al. |
| 2003/0186734 | A1 | 10/2003 | LeMay et al. |
| 2004/0029630 | A1 | 2/2004 | Walker et al. |
| 2004/0106652 | A1 | 6/2004 | Kimura et al. |
| 2004/0209665 | A1 | 10/2004 | Walker et al. |
| 2004/0218835 | A1 | 11/2004 | Loew |
| 2005/0092841 | A1 | 5/2005 | Barkan |
| 2005/0098633 | A1 | 5/2005 | Poloniewicz et al. |
| 2005/0161511 | A1 | 7/2005 | Parker et al. |
| 2005/0163385 | A1* | 7/2005 | Thakur .................. 382/224 |
| 2005/0233797 | A1 | 10/2005 | Gilmore et al. |
| 2005/0237580 | A1 | 10/2005 | Coleman et al. |
| 2005/0238260 | A1 | 10/2005 | Coleman et al. |
| 2006/0063589 | A1 | 3/2006 | Chong |
| 2006/0079311 | A1 | 4/2006 | Nulph |
| 2006/0122910 | A1 | 6/2006 | Chau et al. |
| 2006/0152595 | A1 | 7/2006 | Ryu et al. |
| 2006/0221354 | A1 | 10/2006 | Slaten et al. |
| 2006/0255145 | A1 | 11/2006 | Chung et al. |
| 2006/0290886 | A1 | 12/2006 | Santos |
| 2006/0291004 | A1* | 12/2006 | Dymetman .................. 358/474 |
| 2007/0109511 | A1 | 5/2007 | Kelly et al. |
| 2008/0240614 | A1 | 10/2008 | Garcia |
| 2009/0015883 | A1 | 1/2009 | Kim |
| 2009/0020606 | A1 | 1/2009 | Chung et al. |
| 2009/0021798 | A1 | 1/2009 | Abahri |
| 2009/0051814 | A1* | 2/2009 | Shirane et al. ............. 348/571 |
| 2009/0167960 | A1 | 7/2009 | Miyasato |
| 2010/0060943 | A1 | 3/2010 | Monga et al. |

FOREIGN PATENT DOCUMENTS

| | | | |
|---|---|---|---|
| EP | 1 441 315 | A1 | 7/2004 |
| WO | WO 00/04487 | A1 | 1/2000 |
| WO | WO 01/04571 | A1 | 1/2001 |
| WO | WO 2007/114241 | A1 | 10/2007 |

OTHER PUBLICATIONS

Boone, J.M. et al., "Analysis and Correction of Imperfections in the Image Intensifier-TV-Digitizer Imaging Chain," Medical Physics, vol. 18, No. 2, Mar./Apr. 1991, pp. 236-242.

European Patent Application No. 09166997.8, filed Mar. 14, 2006: Search Report, dated Sep. 9, 2009 (8 pages).

European Patent No. 1 861 809: Notice of Opposition, dated Feb. 4, 2010, and Facts and Arguments in Support of Opposition (24 pages).

Fantozzi, S. et al., "A Global Method Based on Thin-plate Splines for Correction of Geometric Distortion: An Application to Fluoroscopic Images," Medical Physics, vol. 30, No. 2, Feb. 2003, pp. 124-131.

Glasbey, C.A. et al., "A Review of Image Warping Methods," Journal of Applied Statistics, vol. 25, No. 2, Apr. 1998, pp. 155-171.

International Patent Application No. PCT/US2006/009362: International Search Report and Written Opinion; Date of mailing: Sep. 21, 2006 (16 pages).

International Patent Application No. PCT/US2009/058018: International Search Report and Written Opinion; Date of mailing: Jan. 25, 2010 (9 pages).

International Patent Application No. PCT/US2009/065660: International Search Report and Written Opinion; Date of mailing: Mar. 8, 2010 (13 pages).

U.S. Appl. No. 12/236,843, filed Sep. 24, 2008: Office Action, dated Nov. 22, 2010.

U.S. Appl. No. 12/236,843, filed Sep. 24, 2008: Notice of Allowance, dated May 11, 2011.

U.S. Appl. No. 13/026,712, filed Feb. 14, 2011: Office Action, dated Jun. 13, 2011.

* cited by examiner

SYSTEM AND METHOD FOR SCENE CHANGE TRIGGERING

RELATED APPLICATIONS

The present invention is a continuation-in-part of U.S. patent application Ser. No. 11/376,052, filed Mar. 14, 2006 now U.S. Pat. No. 7,920,299 and titled SYSTEM AND METHOD FOR PROCESSING A FORM, which claims priority from U.S. Provisional Patent Application Ser. No. 60/661,698, which was filed on Mar. 14, 2005. Each of these patent applications is of common ownership with the present invention. These earlier applications are incorporated herein by reference.

BACKGROUND OF THE INVENTION

1. Field of the Invention

The present invention relates to reading forms, and more particularly to detecting when a form (usually of paper) is newly placed in a reader and stops moving.

2. Background Information

Automatic reading of a form has been a requirement for many industries since automatic form reads have become widespread. These machines might be activated or triggered to read a form in many ways; for example, by the agent pressing a button, by an optical switch that is activated by the form breaking a light beam, by a micro-switch that is physically activated by the form, or by a camera that detects the presence of a form by detecting a light area (the form) within its field of view.

Typically, form reading terminals have a camera with a photo-sensitive surface (arrays of CCDs, photo-diode/transistors, etc.). Optically, the photo-sensitive surface may be positioned a few inches to a foot or more away from a form lying on a platen or a flatbed. The optical focus of the system is on the platen with a depth of focus suitable to accommodate a wide range of types of forms. Herein "camera" is defined broadly as virtually any optical reader.

FIG. 1 represents a known terminal system 2 with a cavity 4 into which a form 6 is fed. Here, the cavity 4 may be largely shielded from external light, and there may be a tractor drive to hold the form 6 flat as it is drawn into the cavity 4. A camera and a light source may be fixed in the cavity 6 and detect the more reflective forms by the additional light reflected to the camera as compared to a blackened platen.

In other systems, the platen or flatbed bearing the form may be relatively open and easily accessible, and thus easy to use. In these systems, ambient light reflects more from the form rather than platen sending more light energy to a camera. The increase in light energy striking the camera from the form's white area is used to detect the presence of a form and the relative constancy of the energy or the white area content is used to determine the presence and stillness, respectively, of the form. In this and similar applications, however, limitations are present. For example, the user's proximity to the terminal may cast a shadow, the user's hand may enter the camera's field of view, any ambient lighting may change as lights are turned on or off and the time of day changes, and the user's clothing or jewelry may add reflected light.

Beyond external and ambient problems, still other problems may occur as a result of the operation of the system or the camera. For example, the machine may have difficulty determining when the form is still. Repetitive pictures from the camera may continuously show changes in the white content that might be the form moving or the ambient light changing or a shadow being removed, etc. It may be difficult to determine the presence and stillness of a form in these known systems. Since the scene is measured by a camera with camera electronics outputting a video stream, for example, electronics must process the video stream. The scene is analyzed and thresholds set to indicate the new presence of a motionless form. However, to determine the presence and stillness of a form requires time and processing power, and repeating the effort is inefficient and possibly erroneous if the yes/no thresholds are lowered or raised to quicken the process.

If the white content thresholds are reduced, to indicate that a form was inserted and still, it may result in moving tickets being measured and light changes being recognized as newly inserted forms. Either case may result in errors. Raising the threshold may result in forms not being recognized. Both of these cases will likely result in ticket agent and user frustration. Hereinafter, the term "form" refers to any paper product that may be machine read, such as tickets or printed slips. In some applications, the forms may include gaming tickets and play slips.

It would be advantageous to have an easy to use terminal with a platen relatively open to the local environment. But the above listed limitation must be overcome.

SUMMARY OF THE INVENTION

The present invention provides an open platen system for determining when a form has been newly placed on a platen, and when it is still by looking, not at the white content of a scene but at the black content of the scene. When a form is first introduced, the black area of a scene decreases, but then it remains about constant when the form is still.

It has been found that measuring the black content of a scene is superior to measuring the white content since the black areas are less affected by the above limitations than are white areas. The result is that a threshold on a gray level scale is more easily selected when applied to black levels or dark areas. Those areas are less affected by ambient light and other such changes.

In an embodiment, a camera views a scene of the platen of about 9" wide by 7" long, and the camera provides a video stream comprised of pixels that is processed by electronics. The electronics/software may be configured to produce a histogram of the scene along with other programs that operate on the pixels.

A histogram of a video scene is a graph of the number of pixels that indicate a given light intensity. There is no positional information in a typical histogram. That is, two pixels of the same light intensity may not be near each other at all. In one embodiment, the camera may be arranged to present the 9"×7" scene as an array of 1280 by 1024 pixels. The light level of each pixel may be measured by the camera into a number of gray levels, for example, there may be eight bits or 256 gray levels represented in each pixel output by the camera.

In the above case, a histogram may record a high intensity or high light level (the white areas) striking the camera by outputting a gray level scale of 8 bits for a dynamic range of 0 to 255. Here, the whitest white is at 255 and the blackest black is at 0. In one embodiment, white levels are defined as 57 and higher out of the 256 gray levels, and the black levels are defined as 56 and lower out of the 256 gray levels. That is, the black levels are near the low end of the 256 levels and the white levels are most of the rest of the levels up to the high end of the gray levels. The inverse where black is at the high end and white at the low end of the 0-255 range may also be used in other applications.

Illustratively, in practice, the black area of a scene may be measured in low resolution so as to reduce processing requirements while increasing processing speeds. For example, a reduced array of pixel may be processed. A 1280×1024 array of pixels each carrying an 8-bit binary gray scale code may be reduced and processed, for example, every eighth pixel may be accumulated, thus forming a 160×128 array. A threshold based on a gray scale is heuristically determined. For example, with an 8-bit gray scale, the black level may have a threshold set at 25/256 that accepts only about 20% of the black dynamic range. With no form in the viewing area, the entire scene may be below the 56/256 level as shown by solid curve A of FIG. 4. When a form is introduced into the viewing area, the size of the black area markedly decreases—the system has detected a form that has entered the viewing area. For example, the size of the black area may be reduced to about ½ or less of the viewing area with the white areas rising to yield the same total number of pixels in the scene as shown by dotted curve B in FIG. 4. The system then measures the constancy of the reduced size of the black area on successive scenes, preferably at least three frames, until the reduced size is stable. That signifies that the form is still.

The constancy of the size of the reduced black area (used to determine a form is still) is again heuristically determined and set to minimize false triggering. If the size of the black area in the histogram varies by less than about 5% in some applications, but in other applications the variation might be lower than 1%, the newly introduced form is determined to be still and the system may read the information on it.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
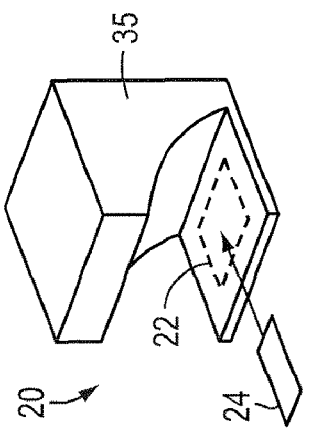
FIG. 1 is a block view of a prior art optical reader.
Figure 2A:
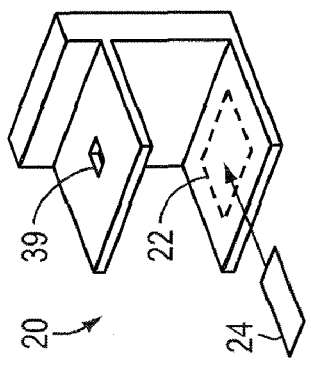
FIG. 2A is a isometric view of a terminal in accordance with the present invention.

FIG. 2A illustrates a form reading system 20 that is open on three sides. A camera 39 is installed in the top looking down at the scene 22. The scene area is preferably about 9" by 7" and is arranged for a form 24 to be placed into that scene 22.

Figure 2B:
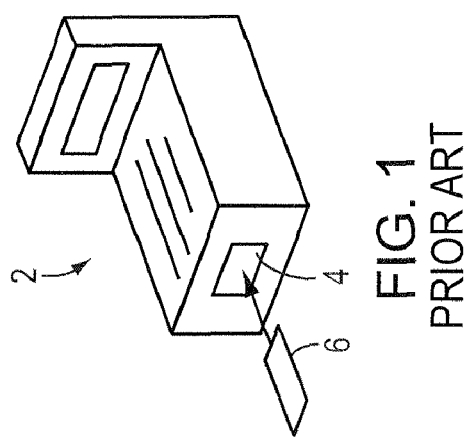
FIG. 2B illustrates another isometric view of a terminal in accordance with the present invention.

In some applications, as illustrated in FIG. 2B, a shroud 35 may be placed around and over at least a portion of the system 20 to reduce stray light from entering the viewing area. The shroud 35 may block all or portions of the sides, and it may also block portions of the front where the form 24 is introduced. As will be recognized by those skilled in the art, the shroud 35 may have any configuration which accomplishes these functional objectives.

Figure 3:
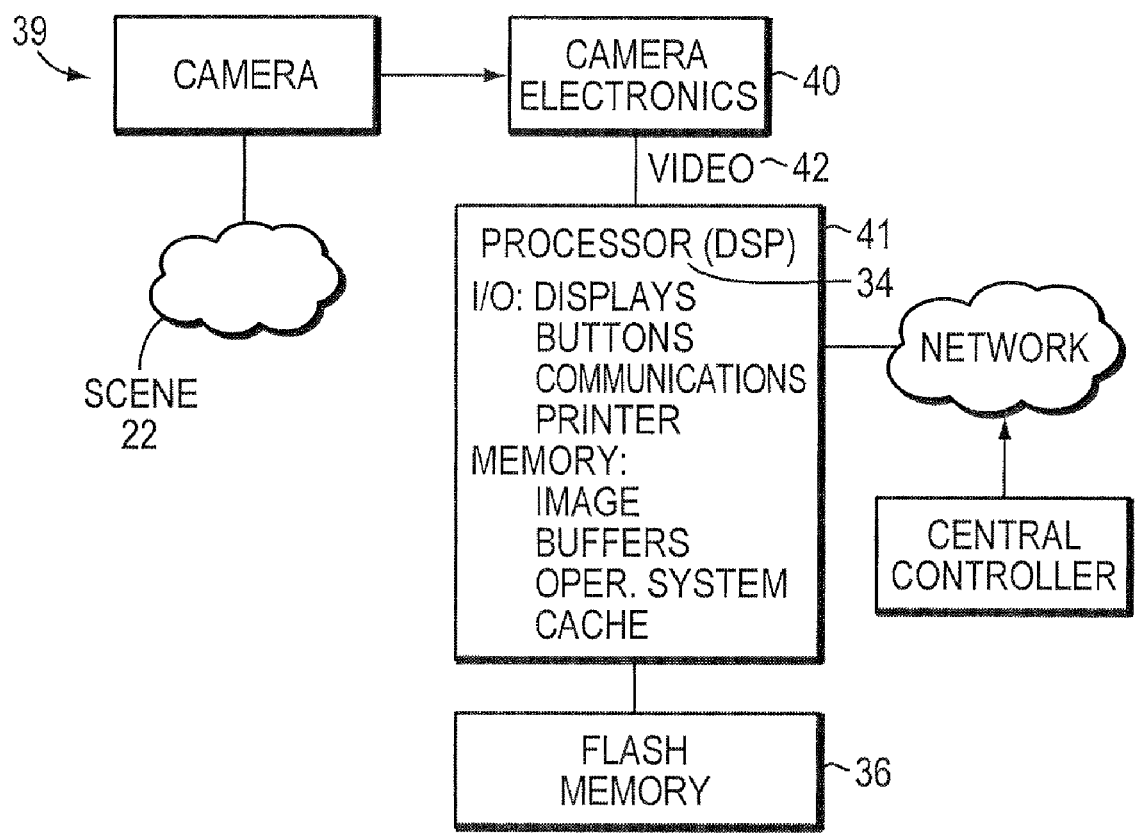
FIG. 3 is schematic block diagram of a system in accordance with the present invention.

FIG. 3 schematically illustrates the form reading terminal with a scene 22 and camera 39 feeding a signal to the camera electronics 40. A video data stream 42 of 160×124 carrying 8-bit gray scale pixels enters an electronic assembly 41 where a processor system 34 that, preferably, includes a DSP (digital signal processor) receives the video data stream 42. For the purposes of this illustration, the frame rate may be about 20 frames per second; however, other frame rates may be used. A micro-processor may be used in some applications. The processing system 34 includes I/O device drivers and buffer electronics for, at least, buttons, display, communications and, possibly, a printer. Memory includes, at least, one or more image buffers, operating applications and possibly cache. In one embodiment, an external, removable Flash memory 36 is used to up load the application program to the processor system 34. Removing the Flash memory 36 from the terminal 20 removes all the software from the terminal. The processing steps are executed by the processor on program instructions loaded into the memory. But the processing steps may be executed by program modules distributed over the entire network.

As known to practitioners in the art, the camera electronics 40 scan the photo-sensitive surface in the camera 39, usually in an X/Y raster style format (flying spot style may also be used). The light intensity striking the photo-sensitive surface of the camera 39 is converted into pixels coded in gray scale levels, for example an eight bit code. The video stream 42 generated in the raster format by the camera electronics 40 encodes the scene left to right, top to bottom. The format carries indicators of the top, the beginning of each line and the end of the raster.

Figure 4:
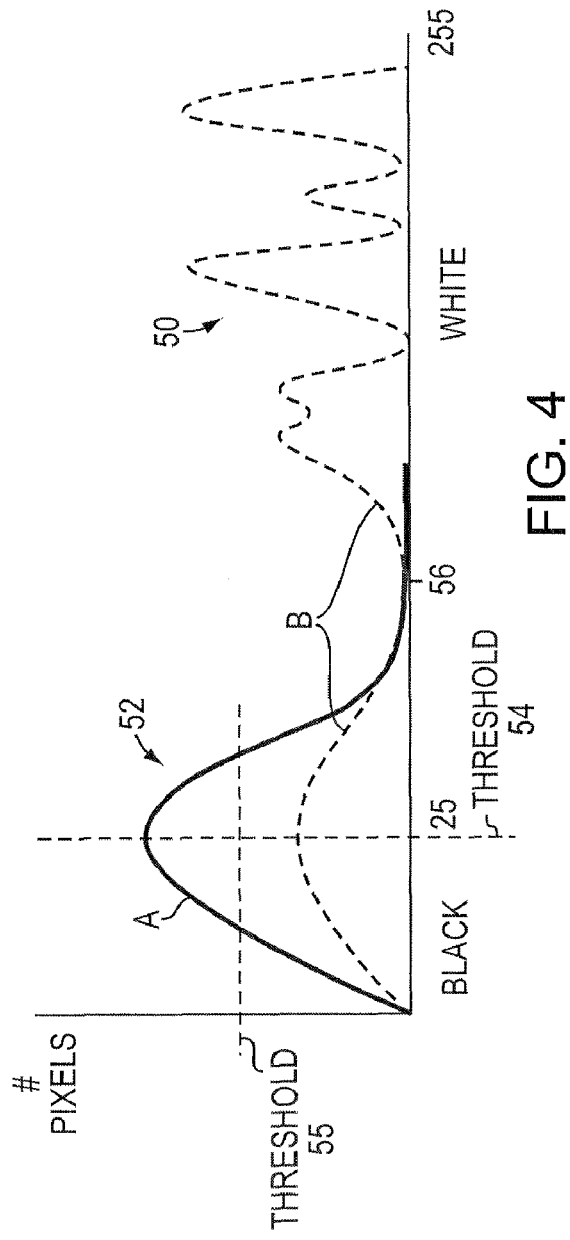
FIG. 4 is a histogram with traces representative of the operation of the present invention.

FIG. 4 illustrates two graphical traces A and B, wherein the vertical axis represents number of pixels and the horizontal axis represents a gray scale from black to white. With an eight light level intensity scale in the system described above, black is at the 0 end and white at the 255 end. Trace A illustrates the scene where the camera 39 only views a bare platen scene 22—all the pixels are near the black end. Typically, there will be a range as the platen scene 22 will reflect some light in a random-type pattern. If the camera electronics 40 is processing the video image data in a reduce resolution manner only one out of every twenty pixels are processed. This increases processing speed.

When a form 24 enters the scene 22, from FIG. 4, the white area 50 under the trace B changes from near zero to one half or more of the total number of pixels, and the area 52 under the black portion of the curve A will be correspondingly reduced. Either change may be used to determine that a form 24 has entered the scene 22. The above listed limitations, however, render the white content change from being a reliable source to determine when the form 24 is still.

The area under the A trace, that is the number of pixels in at each gray level value, added over all the gray level values will equal the number of pixels processed. When a form 24 is inserted into the scene 22 trace B occurs. Here, the form 24 reduces the black area 52 by the number of pixels that are now in the white area 50. The total number of pixels remains constant. As mentioned above, the occurrence of the white content rises could be used to detect the presence of the form but the content of the black area decreasing may also be used for this purpose.

A threshold 55 is established heuristically depending upon the size of the forms 24 and the scene 22. If, for example the largest form covers about half the scene area and the smallest about a third, then the threshold 55 might be set at about one quarter of the scene. That is, the total number of pixels above the threshold 55 in the trace A is set to be about one fifth of the total number of pixels in the scene. When any form 24 is placed in the scene 22, a quarter or more of the pixels are transferred from the black (under the A curve) to the white (under the B curve) and the threshold 55 may be reached. In this case, the system 20 determines that a form is in the scene. Of course, the threshold 55 may be changed in other applications.

Once a form is detected the system 20, on subsequent pictures of the scene applies a different threshold 54 that establishes a level within the black range. For example, the threshold 54 might be set at the value of 25. In this case, the system 20 is totaling the number of pixels under the trace B to the left of the threshold 54. Once that number remains constant the form 24 is deemed to be still. The number might be in the range of 5 to 35 percent of the total number of pixels from black level 0 to the black level 25. And the variation in the number of pixels from frame to frame that the system 20 determines the form 24 is still may be determined heuristically. That is, the frame to frame variation may be determined by minimizing false triggering. In practice, the variation may be in the range from below 1 to more than 5%.

The system 20 may be used to detect the presence of a succession of forms.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A system for detecting when to read a form placed in an electronic form reader, the system comprising:
   a camera that accepts light reflected from a scene and converts it into video frames, each frame comprising a stream of pixels; wherein each pixel has a gray scale range of light intensities from first to second light intensity levels, wherein the first light intensity levels represent black levels and second light intensity levels represent white levels;
   processing electronics that receive the stream of pixels and generate a histogram therefrom; and
   a comparator that compares a portion of the first light intensity pixels in the histogram from a series of frames, and when the portion remains about constant, determines the form to be still.

2. The system of claim 1 wherein the portion of first light intensity pixels is about 20% of the scene.

3. The system of claim 1 further comprising a threshold selected from the gray scale, the threshold determining the portion of the first light intensity pixels to be compared by the comparator.

4. The system of claim 1 wherein when the form is determined to be still the variation in the portion of first light intensity pixels in the series of frames is about 1%.

5. The system of claim 1 further the system averages more than one frame of pixels to generate the histogram.

6. A process for detecting when to read a form placed in an electronic form reader, the process performed by a device comprising a camera and a processor, the process comprising the steps of:
   receiving, by the camera, light reflected from a scene and converting it into video frames, each frame comprising a stream of pixels, wherein each pixel has a gray scale range of light intensities from first light intensity levels to second light intensity levels, wherein the first light intensity represents black and the second light intensity represents white;
   processing, by the processor, the stream of pixels and generating a histogram therefrom; and
   comparing, by the processor, a portion of the first light intensity pixels in the histogram from a series of frames, and when the portion remains about constant, determining the form to be still.

7. The process of claim 6 wherein the step of comparing compares about 20% of the scene.

8. The process of claim 6 further comprising the step of thresholding the gray scale, and determining the portion of the first light intensity pixels to be compared by the comparator.

9. The process of claim 6 wherein when the form is determined to be still the variation in the portion of first light intensity pixels in the series of frames is about 1%.

10. The process of claim 6 further comprising the steps of averaging the pixels from more than one frame to generate the histogram.

11. A non-transitory computer readable medium comprising instructions for execution on one or more processors, the instructions causing the one or more processors to perform the process of detecting when to read a form placed in an electronic form reader, the process comprising:
    receiving video frames, each frame comprising a stream of pixels, wherein each pixel has a gray scale range of light intensities from first light intensity levels to second light intensity levels, wherein the first light intensity represents black and the second light intensity represents white;
    generating a histogram from the stream of pixels;
    comparing a portion of the first light intensity pixels in the histogram from a series of frames; and
    when the portion remains about constant between frames, determining the form to be still.

12. A process for detecting when to read a form placed in an electronic form reader, wherein the process is executed by program modules distributed over the network, the process comprising the steps of:
    receiving, by a first program module, video frames representing light reflected from a scene, each frame comprising a stream of pixels, wherein each pixel has a gray scale range of light intensities from first light intensity levels to second light intensity levels;
    processing, by the first program module, the stream of pixels and generating a histogram therefrom; and
    comparing, by a second program module, a portion of the first light intensity pixels in the histogram from a series of frames, and when the portion remains about constant, determining the form to be still.

* * * * *